Nov. 15, 1955 R. G. MINET 2,723,951
PROCESS AND APPARATUS FOR THE REMOVAL OF FINELY DIVIDED
SOLID CARBONACEOUS PARTICLES FROM FLUIDIZED CARBONIZERS
Filed Jan. 7, 1955
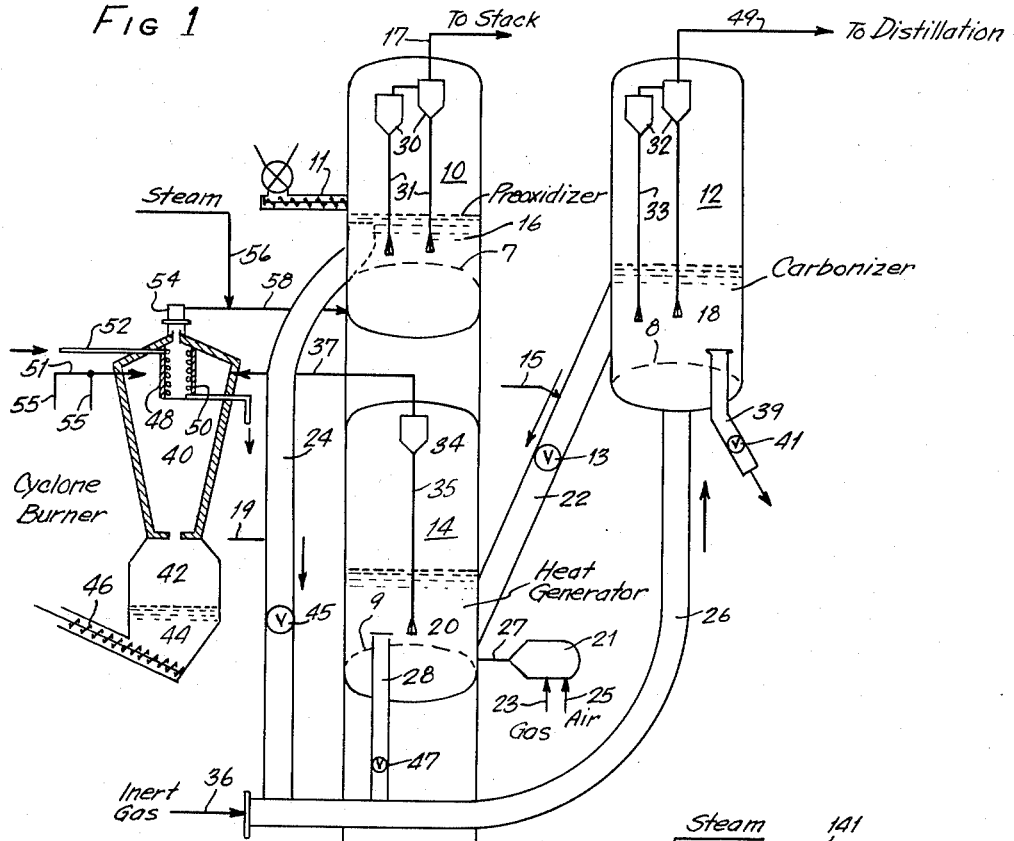
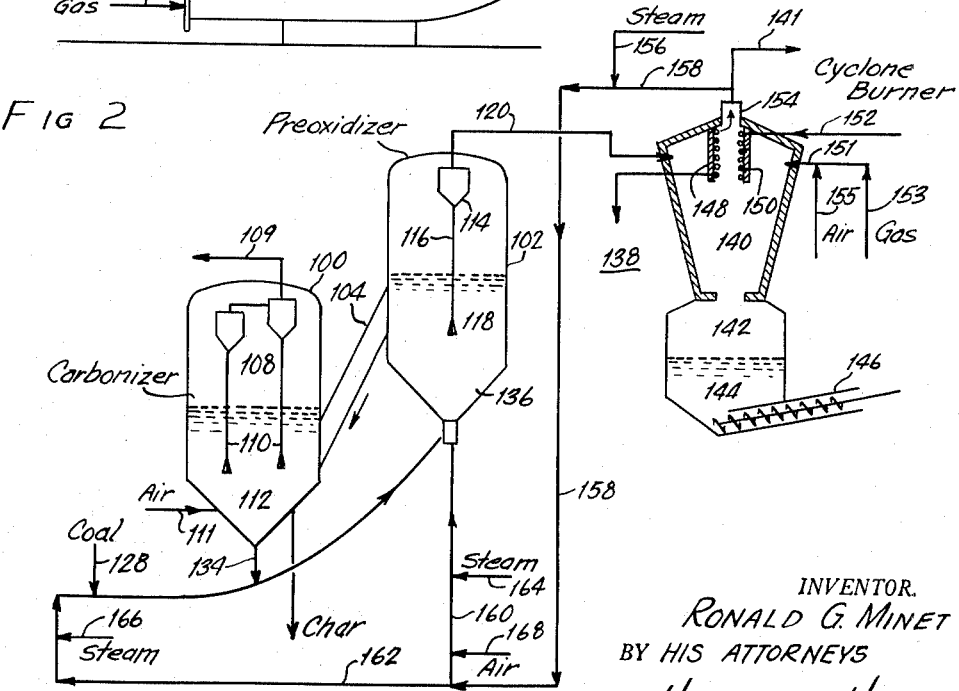
INVENTOR.
RONALD G. MINET
BY HIS ATTORNEYS
Howson and Howson.

United States Patent Office 2,723,951
Patented Nov. 15, 1955

2,723,951

PROCESS AND APPARATUS FOR THE REMOVAL OF FINELY DIVIDED SOLID CARBONACEOUS PARTICLES FROM FLUIDIZED CARBONIZERS

Ronald G. Minet, Philadelphia, Pa., assignor to United Engineers & Constructors Inc., Philadelphia, Pa., a corporation of Delaware Application January 7, 1955, Serial No. 480,469

20 Claims. (Cl. 202—9)

This invention relates to a process and apparatus for the carbonization of carbonaceous materials such as coal, peat, lignite, or the like, and particularly to a carbonization process of improved efficiency which will produce a valuable gaseous product free from contamination by fine solid particles.

Many processes have been suggested for the carbonization of coal and other carbonaceous materials to produce valuable chemicals such as benzene, toluene, xylene, and phenolic compounds.

Recently, much attention has been directed to the use of the fluidized bed technique in such processes, particularly where the processes are carried out at low temperatures, i. e., between 800 and 1300° F.

In such processes, there are usually at least two fluidized beds located in two separate vessels. In one of these beds the principal reaction carried out is carbonization. In the other bed, the chief reaction is oxidation or partial oxidation of the carbonaceous material or of a part of the carbonaceous material.

The term "carbonization" is used here to mean a destructive distillation of coal or other carbonaceous material, with the production of a stream of hot gases containing the volatile ingredients of the carbonaceous material and a char or coke containing elemental carbon and ash. The vessel or bed in which carbonization is the chief process taking place, is referred to herein as the carbonizer, or carbonization vessel or bed. Such carbonization may be accompanied by oxidation, in the same bed, but so long as the gaseous product stream has as a principal component compounds resulting from carbonization, the bed itself is referred to as a carbonization bed and the vessel as a carbonization vessel or more simply, as a carbonizer.

The term "oxidation" is used here to mean the combining of oxygen with the carbonaceous material being processed or with a part of that material. Thus, in many low temperature carbonization processes, using finely divided raw material, it is necessary to preoxidize the carbonaceous material to prevent agglomeration during the carbonization stage. Such preoxidation is considered to be an "oxidation" process as the term is used herein. Again, in many low temperature carbonization systems, the char which results from carbonization is burned to furnish heat for carbonization of fresh material. Such combustion may also be an "oxidation" process as the term is used herein.

Usually there is a cyclic exchange of solids between oxidation and carbonization beds, material being continuously transferred from the oxidation bed to the carbonization bed and vice-versa.

Use of the fluidized bed technique as outlined has many advantages; for example, a uniform temperature may be maintained throughout each fluidized bed.

At the same time, the use of fluidized solids in a carbonization process introduces certain handicaps which must be overcome for industrial acceptance of the process.

One such handicap arises from the solid particles which are always entrained by gases emerging from the beds. It is desirable that these particles be removed from the outgoing gases, and consequently provision is made in most systems for separation devices such as cyclone separators to remove entrained solids from the outgoing gases and return them to the fluidized beds.

In selecting separation devices for this purpose, the tendency is to design the separation devices in each case to remove substantially all the solid material from the gas stream and return it to the bed whence it came. If this practice is followed, however, and solid particles are continuously returned to each bed and are continuously exchanged between beds, the size of these fine particles will be constantly reduced through attrition until eventually some of them escape through the separation devices and pass out into the product stream. Where the product is to be distilled, the fine particles of ash and coke will agglomerate on distillation trays, deposit on still tubes, and generally reduce the efficiency of the distillation process. If allowed to pass out of the stack, they will cause objectionable air pollution. Such pollution is especially undesirable in low temperature carbonization processes, because low temperature carbonization systems offer great potentialities when operated in populated areas in conjunction with municipal power plants. In addition, the loss of small particles of carbonaceous material represents loss of fuel which might have been converted to useful heat.

It is therefore an object of the present invention to provide a process and apparatus for the carbonization of finely divided solid carbonaceous material by means of which a stream of gaseous products of carbonization may be obtained free from entrained solid contaminants.

It is a further object of the present invention to provide a process and apparatus for the carbonization of finely divided solid carbonaceous materials in which maximum use is made of all portions of the carbonaceous material.

It is a further object of the invention to provide a process and apparatus for the carbonization of carbonaceous materials in which stack gases from the carbonization plant are kept substantially free of entrained solid particles.

According to the invention, these and other objects are obtained in a fluidized bed carbonization system having an oxidation vessel and a carbonization vessel, both equipped with solids separation devices and having means for interchange of solids between the two vessels, by making the separation device associated with the oxidation vessel less effective than that associated with the carbonization vessel. By this means, a stream of the finer particles may be continuously removed from the oxidation vessel before their size has been reduced sufficiently to permit them to pass through the separation devices associated with the carbonization vessel. Preferably, the stream of gas bearing the fine solids after removal from the oxidation vessel is sent to a cyclone burner where the combustible components are burned to produce a liquid slag and a clean hot stack gas which may be employed as a source of heat in other stages of the over-all carbonization process.

The invention, therefore, provides in a process for the carbonization of finely divided solid carbonaceous material in which at least a portion of the carbonaceous material is oxidized in a first fluidized powder bed, and carbonaceous material is carbonized in a second fluidized powder bed, there being cyclic interchange of solids between said beds, and in which a first gaseous stream carrying entrained solids is removed from said first bed, and a second gaseous stream carrying entrained solids is removed from said second bed, an improvement which comprises removing at least a major fraction of the entrained solids from said second stream and returning them to said second bed, removing a major fraction but a fraction substantially less than said first-named fraction of the entrained solids from said first stream and returning them to said first bed while retaining in said first stream solids of substantially greater particle size than the smallest particles removed from said second stream and carrying the solids retained in said first stream from the system.

The invention further provides for burning the solids-containing stream from said first bed in a vortically moving body of gas to reduce substantially all the solids to liquid or gas in which form they are readily disposed of.

The invention further provides apparatus for the carbonization of finely divided solid carbonaceous material which comprises a carbonization vessel, means for maintaining a first fluidized bed of finely divided solid particles in said carbonization vessel, an oxidation vessel, means for maintaining a second fluidized bed of finely divided solid particles in said oxidation vessel, means for conveying solids from said first bed to said second bed and from said second bed to said first bed, a first offtake means for removing gaseous product from said first fluidized bed, said first offtake means including a first solids separation system and means for returning separated solids from said first solids separation system to said first bed, a second offtake means for removing gaseous product from said second fluidized bed, said second offtake means including a second solids separation system and means for returning separated solids from said second solids separation system to said second bed, said second solids separation system being of lower effectiveness than said first solids separation system to permit the escape from the apparatus of solid particles of a size which would be returned to said first bed by said first solids separation system.

The invention further provides apparatus as described above in combination with a cyclone combustion device arranged to receive and burn gas and entrained solids from said second solids separation system.

The terms "solids separation device" and "solids separation system" are used herein to indicate any suitable apparatus for separating entrained solids from a gaseous stream. The simplest example of such devices is the conventional cyclone separator, but other types of separators such as the so-called Multiclones may be used. Electrostatic precipitators are also included within the term, although the practical difficulties in their employment are great.

The solids separation devices used in the present invention may be physically located within the carbonization or oxidation vessel whose gaseous product they receive or may be located outside the vessel. In general, it is preferred to have them inside because of the saving in heat and because the pressure differential between the inside and outside of the separator is less, permitting lighter and less expensive construction.

It has been stated that in the carbonization vessel a major fraction of the solids are removed from the product gases. It will be obvious that the completeness with which solids are removed from the gases in the carbonizer can be made as high as desired, depending on the number, size and effectiveness of the separation devices it is desired to use.

Generally speaking, it will be desired to design the solids separation system associated with the carbonization vessel to separate substantially all particles of diameter greater than 20 microns and at least 75% of particles having a diameter less than 10 microns but greater than 5 microns. Preferably, the carbonization vessel separation system should be designed to separate substantially all particles of diameter greater than 10 microns and at least 90% of particles having a diameter less than 10 microns but greater than 5 microns from the gases leaving the carbonization vessel.

In general, it will be found that with the carbonization vessel separation system so designed, and with an oxidation vessel separation system as set forth below, substantially all the solids will be removed from the gaseous products of carbonization. Generally, the gases escaping from the carbonizer will contain not more than about 5 grains of solids per 100 standard cubic feet, and preferably not more than about 2 grains per 100 standard cubic feet.

The effectiveness of the oxidation vessel separation device is chosen with a view to the effectiveness of the carbonization separation device. If, for example, the latter will remove substantially all (better than 95%) particles greater than 10 microns, but only 90% of particles smaller than 10 microns, the former should not remove any appreciable quantity of particles smaller than 5 microns. Generally speaking, the oxidation vessel separation device should not remove more than a minor fraction of particles smaller than $(k-5)$ microns, where $k$ is the smallest particle which will be substantially entirely removed in the separation device of the carbonizer.

With solids separation systems constructed and arranged as described, it will be found that in general a major portion of the solids entrained in the gases leaving the oxidation vessel will be returned to the oxidation vessel, but that a substantial quantity, say between about 75 and about 25 grains per 100 standard cubic feet, will be retained in the gases escaping from the oxidation vessel.

The term "cyclone burner" or "cyclone combustion device" is used to designate a combustion device in which a stream of gas or gas with entrained solids is burned while moving in a confined vortical path.

It has been pointed out that the invention preferably includes the use of a cyclone burner to receive the solids-laden stream issuing from the separation system of low effectiveness. The cyclone burner is uniquely suitable for this purpose, since it not only substantially entirely eliminates solid contaminants from the gas stream, but makes use of the last grains of carbonaceous material to produce useful heat. In effect, it produces heat from the waste material of what is essentially an endothermic process, which heat can thus profitably be returned to the process.

Notwithstanding the very real and important advantages resulting from the use of a cyclone burner, the invention in its broadest aspects does not depend on the use of such device. It is possible, for example, to pass the solids-laden gases removed from the oxidation bed separation system through a spray tower, an electrostatic precipitator, or even through another conventional cyclone system so long as the solids separated in such device are not returned to the oxidation bed or to the carbonization bed, but on the contrary, are removed from the over-all carbonization process.

The invention will be described further in connection with the accompanying drawings. For purposes of illustration, the detailed description which follows is applied to a process for the low temperature carbonization of bituminous coal, it being understood that the invention is not limited to such process, but can be used with other carbonaceous solids such as peat or lignite.

In the drawings:

Fig. 1 is a schematic flow diagram showing a preferred system for the low temperature carbonization of bituminous coal according to the invention, in which substantially no oxidation occurs in the carbonization vessel, and Fig. 2 is a schematic flow diagram showing another system for the low temperature carbonization of bituminous coal according to the invention in which limited oxidation is carried out in the carbonization vessel.

Referring first to Fig. 1, the low temperature carbonization system shown therein comprises a preoxidizer 10, a carbonizer 12, and a heat generator 14.

These units are more or less cylindrical vessels containing grids 7, 8, and 9 respectively. Each unit is adapted to support a bed of fluidized solids indicated in the drawing as 16, 18, and 20, respectively.

As shown in Fig. 1, the preoxidizer 10 is preferably mounted above the heat generator 14 and, as shown, these two units may have a common shell. The carbonizer 12 is positioned above and to one side of the heat generator 14, and is connected to the heat generator by an inclined duct 22, which permits passage of solids by gravity from the carbonizer into the heat generator. The duct 22 is preferably fitted with an aeration device such as steam line 15 for maintaining the solids moving to heat generator 14 in free-flowing condition. A valve 13 is further provided in line 22 for regulating the flow of materials therethrough.

The heat generator 14 is provided with a burner 21 having fuel gas and air inlets 23 and 25 respectively. A line 27 is provided for delivering the gaseous products of combustion from burner 21 into the heat generator 14.

Fresh finely divided solids are delivered to preoxidizer 10 by means of a feeding device such as a screw conveyor 11. Solids are removed from the bottom of carbonizer 12 through a standpipe 39. A valve 41 is provided in this standpipe for controlling the flow of solids through it.

A standpipe 24, suitable for the flow of fluidized solids leads from the preoxidizer 10 to a duct 26 which in turn leads to the bottom of carbonizer 12 and provides a means for conveying preoxidized coal to the carbonizer. Preferably the standpipe 24 has means such as a line 19 for the introduction of an inert aerating gas such as steam to maintain the material removed from the preoxidizer in fluidized condition. A valve 45 is mounted in the standpipe 24 to control the flow of fluidized solids therethrough.

A standpipe 28 having a control valve 47 connects the bottom of heat generator 14 with the duct 26 downstream of its junction with standpipe 24, whereby hot char from the heat generator can be delivered to the carbonizer. A line 36 is provided at the head of duct 26 for introducing an inert carrier gas into the duct 26 to carry the solids from the preoxidizer 10 and heat generator 14 into the carbonizer 12.

As shown in Fig. 1, preoxidizer 10 and carbonizer 12 are fitted with solids separation systems such as two-stage cyclone systems 30 and 32. The heat generator 14, on the other hand, has a less effective solids separation system, for example, a single-stage cyclone system 34. The cyclones of systems 30, 32, and 34, each have dip legs 31, 33, and 35 respectively, which preferably extend below the upper level of fluidized solids in beds 16, 18, and 20, to seal off the dip legs and prevent by-passing of the cyclones.

The cyclone system 30 of preoxidizer 10 may be designed without particular reference to the other cyclone systems, 32 and 34, since there is no recirculation of solids between the preoxidizer 10 and the other vessels. It may be designed to retain substantially all particles greater than about 20 microns in diameter and at least 90% of particles smaller than 10 microns in diameter.

Under the preferred conditions, substantially all solids are removed from gases leaving the preoxidizer 10.

The cyclone system 32 of the carbonizer 12 is designed to retain in the carbonizer substantially all particles greater than about 10 microns in diameter, and at least 90% of all particles having a diameter less than 10 microns.

With the construction described, not more than about 5 grains of solids per 100 standard cubic feet are retained in the gases leaving the carbonizer 12 and preferably substantially all entrained solids are removed from those gases.

The cyclone system 34 of the heat generator 14, on the other hand, is only designed to remove substantially all particles greater than about 20 microns in diameter and at least 70% of all particles less than 10 microns.

Under the conditions described, between about 75 grains and about 25 grains of solids per 100 standard cubic feet are retained in the gases removed from the heat generator 14.

The gases passing out of the carbonizer 12 through cyclone system 32 enter line 49 whence they may be delivered to condensing and distillation equipment (not shown).

The overhead gases from preoxidizer 10 are delivered to a line 17 whence they may be sent to the stack or used for heating purposes as desired.

The outlet from cyclone separator 34 is preferably connected to a cyclone burner 38 as by a line 37. The cyclone burner 38 is of standard design and comprises a cone-shaped upper chamber 40 made of refractory material and a lower quenching chamber 42, adapted to receive slag from the chamber 40. The chamber 42 is provided with a water bath 44 for quenching the received slag and a worm 46 for removing the quenched slag.

Chamber 40 has fuel inlet 51 through which air and fuel gas supplied through lines 53 and 55 respectively can be fed in suitable proportions.

At the top of the chamber 40, a chimney 48 is provided extending down into the chamber. The chimney is lined with a coil of tubing comprising a so-called "water wall" 50. Water or steam is passed from line 52 through water wall 50 to cool the gases passing out of the chamber.

Chamber 40 is further provided with an outlet 54, which connects to a line 58 leading to the lower portion of preoxidizer 16. A line 56 connecting to line 58 is provided for introducing steam or other inert gas to cool the hot gases from burner 38 prior to their introduction into preoxidizer 10 to avoid overheating the support grid 7.

In operation, finely divided coal having a particle size between about 1/8" and about 500 mesh, and preferably between about 1/16" and about 325 mesh, is fed into the preoxidizer 10 by screw conveyor 11 where it is fluidized by means of the hot gases entering through line 58 and flowing up through grid 7. The fluidized coal forms a turbulent bed 16 at the bottom of the preoxidizer above the grid 7.

The air and gas fed to cyclone burner 38 through inlet 51 are proportioned so that the exit gas leaving the burner through line 58 contains a certain amount of oxygen. This oxygen combines with the powdered coal in the preoxidizer in known manner to prevent its agglomeration.

As shown in Fig. 1, the fluidized bed 16 occupies only a part of preoxidizer 10 and above the bed there exists a considerable space filled with gas carrying entrained particles from bed 16. The gas present in this space is withdrawn continuously through cyclone system 30 wherein substantially all the entrained solids are removed and returned to the bed through standpipes 31.

The resulting gases which are at a temperature of say between about 350° F. and about 750° F., preferably between about 400° F. and about 650° F., pass out through line 17 and are sent off to the stack, preferably after some of their heat has been recovered.

The preoxidized coal is continuously withdrawn from preoxidizer 10 through standpipe 24 and moves downwardly into duct 26. Steam, introduced through line 19, maintains the coal in fluidized condition. In duct 26, the coal meets a stream of inert gas introduced through line 36, and is carried along toward the carbonizer 12. The inert carrier gas introduced in line 36 is preferably a fuel gas comprising principally light hydrocarbons derived from carbonizer 12, but may be any inert gas such for example as steam.

As it moves along the duct 26, the preoxidized coal picks up a quantity of hot char, formed in a manner to be described, from heat generator 14 via standpipe 28. The mixture is carried into the carbonizer 12 where the sensible heat of the char received from the heat generator 14 effects carbonization of the preoxidized coal drawn from preoxidizer 10, producing valuable chemicals such as benzene and the like, and leaving a high-carbon char.

The gases driven off from the coal, together with the fuel gas introduced through line 36, boil up from bed 18, carrying particles of solids with them. They enter the cyclone system 32 where substantially all the solid particles are removed and returned to the bed 18 through dip legs 33. The gases leaving cyclone system 32 are removed through line 49 whence they may be delivered to condensing and distillation equipment (not shown). In such equipment the valuable chemicals referred to are removed, leaving a gaseous hydrocarbon stream which may be used as the carrier gas in line 36.

A quantity of the char produced in the bed 18 continuously flows down through duct 22 to the heat generator 14. In the meantime, fuel gas and excess air are delivered to burner 21 through lines 23 and 25, and are burned. The resulting products of combustion are charged through line 27 to heat generator 14 where they serve to maintain the bed 20 in fluidized condition. The excess of air charged to burner 21 and thence to heat generator 14 supports the combustion of a portion of the char delivered to the heat generator 14 from carbonizer 12. The resulting heat raises the temperature of the unburned char, and this hot char is drawn off through standpipe 28 and sent through duct 26 to carbonizer 12, as described above.

The gaseous products of combustion arising from bed 20 together with entrained particles of char and ash are drawn into low efficiency single-stage cyclone system 34, where part of the entrained solids is removed and returned to the bed 20 through dip leg 35. The smaller particles, between about 75 grains and about 25 grains per 100 standard cubic feet, pass through the system 34 and are delivered to the cyclone burner 38 through line 37.

In the burner 38, the mixture of gas and solids from line 37 moves in a vortical pattern and is joined by fuel gas and excess air from lines 53 and 55 delivered through line 51. The amount of fuel gas introduced is sufficient to develop a temperature in the burner of over 2100° F., preferably above 2800° F. The combustible part of the solids burns and at this temperature substantially all the ash is reduced to a liquid slag which runs down the walls of chamber 40, falls into the water bath 44 in the chamber 42 and is removed by worm 46.

The hot gaseous products of combustion containing excess air, pass up through chimney 48 and are cooled to between about 2500° F. and about 1800° F. by contact with the water wall 50. They pass through outlet 54 and into line 58 where they are combined with steam introduced through line 56, and are thus further cooled to between about 1800° F. and about 1500° F., at which temperature they are introduced into preoxidizer 10, where they serve to fluidize and preoxidize the raw solid fuel as described above.

A somewhat different embodiment of the invention is shown in Fig. 2. Here the low temperature carbonization system comprises two generally cylindrical vessels with conical bottoms, a carbonizer 100 and a preoxidizer 102. A fluidized solids bed 112 is supported in the bottom of carbonizer 100 and a fluidized bed 118 in the bottom of the preoxidizer 102. The preoxidizer is mounted at a higher level than the carbonizer and an inclined duct 104 connects the two and permits preoxidized coal to flow by gravity from the preoxidizer downwardly into the carbonizer.

A two-stage cyclone system 108 is mounted in carbonizer 100. The cyclones have dip legs 110 which preferably extend well into the fluidized bed 112. Cyclone system 108 is designed to remove substantially all particles greater than about 10 microns in diameter and at least 90% of particles smaller than 10 microns in diameter from gases passing out of carbonizer 100.

With this design, no more than about 5 grains per 100 standard cubic feet of solids are retained in the gases leaving the carbonizer 100 and preferably substantially all the solids are removed therefrom.

In accordance with the invention, a solids separation system of relatively low effectiveness, for example, a single-stage cyclone system 114, is mounted in the preoxidizer 102 with its dip leg 116 extending below the upper level of the fluidized bed 118. The cyclone 114 is designed to remove substantially all particles greater than about 20 microns in diameter and at least 70% of particles smaller than about 10 microns in diameter from the gases passing out of peroxidizer 102.

Under these conditions, the stream of gases leaving preoxidizer 102 contains between about 75 grains and about 25 grains of solids per 100 standard cubic feet.

Preferably, a cyclone burner 138 constructed as described above in connection with Fig. 1 is associated with cyclone system 114. Specifically, the burner 138 has an upper refractory-lined chamber 140 and a lower quenching chamber 142. The quenching chamber has a water bath 144 and a worm 146 for removing quenched slag. The upper chamber 140 has a chimney 148, with water wall 150 leading to an outlet 154. Water is supplied to water wall 150 through line 152. Air from line 155 and gas from line 153 are supplied to the burner through line 151. Gaseous products of combustion from outlet 154 are taken off through line 158 for further employment, or may be discharged to a stack (not shown) through line 141.

The gas and entrained solids removed from cyclone system 114 of the preoxidizer 102 are conducted through line 120 to the cyclone burner 138 where they are burned with the production of hot gas and a liquid slag. A line 156 carrying steam or other inert gas connects to line 158 carrying the hot gases from burner 138 so that the gases may be diluted and cooled. The line 158 is then split into two legs. A first leg 160 connects directly to the bottom of preoxidizer 102. The second leg 162 picks up raw coal or other carbonaceous material from line 128 and hot char from line 134 and carries them to the preoxidizer 102. Steam lines 164 and 166 are provided connecting to legs 160 and 162 respectively whereby the temperature and volume of gas fed through the two legs can be controlled. An air line 168 is provided connecting to leg 160 for supplying the oxygen necessary for preoxidation to bed 118.

In operation, finely powdered coal is fed into the steam of gas flowing through leg 162 of line 158. This gas is substantially inert to the coal and comprises the products of combustion drawn from burner 138. The temperature of the gas is usually between about 1800° F. and about 1000° F., preferably between about 1500° F. and about 1200° F.

The stream moves along leg 162 and picks up hot char from the carbonizer 100 fed through line 134. The amount of char fed is regulated to bring the temperature of the whole stream to between about 750° F. and about 400° F. The materials are then delivered into preoxidizer 102 where they form a fluidized bed 118. Meanwhile, a stream of hot gas delivered through leg 160 is also fed to the preoxidizer 102. This latter stream has three functions. In the first place, it maintains the bed in fluid condition. Secondly, since it can, practically speaking, be made as hot as desired, it can be used to bring the temperature of the bed to the level desired for preoxidation, namely, to between about 300° F. and about 750° F., preferably to between about 400° F. and about 650° F. Finally, the oxygen content of the stream may be varied by means of air introduced through line 168, and the stream may thus be used to supply the precise amount of oxygen desired for the preoxidation.

In the preoxidizer, the carbonaceous material is sufficiently oxidized to prevent agglomeration. A stream of solids from the bed 118 of preoxidizer 102 is continuously withdrawn through duct 104 and transferred to the bed 112 of carbonizer 100 which is maintained at a temperature between about 750° F. and about 1200° F. These solids comprise preoxidized but uncarbonized material and recycled char, the ratio of char to coal being greater than 1. In the bed 112, they are contacted with air introduced through line 111. At the temperature described, and with a char/cool ratio greater than 1, the recycled char burns in preference to the uncarbonized material furnishing heat for carbonization and for maintaining the bed at the temperatures recited above. Carbonization of the preoxidized coal thus occurs with the production of a gaseous product stream and char. The gaseous product passes through cyclone system 108 wherein substantially all entrained solids are filtered out, and into line 109 whence it may be charged to condensing and distillation equipment (not shown).

The char is in part sent to carbonizer 102 through line 134 and may in part be withdrawn as product through line 115.

Returning to preoxidizer 102, the gases produced with their entrained material are withdrawn through cyclone system 114. In the system 114 a major fraction of the entrained solids is separated and returned to the bed 118. The smaller sized particles, however, comprising between about 75 and about 25 grains per 100 standard cubic feet, pass through the cyclone system and into line 120 whence they are delivered to the cyclone burner 138. In the burner they are picked up in a vortex of burning solids and gases and are themselves burned to give gaseous products of combustion and a liquid slag. The slag falls into water bath 144 and is quenched. The gases move out into line 158 where in admixture with cooling steam from line 156 they may be employed in preoxidizer 102. Excess gases from burner 138 may be sent through line 141 to a stack (not shown).

It will be observed that the process and apparatus described provide a kind of safety valve by means of which solid particles can be removed from a fluidized bed carbonization system and disposed of efficiently before their size has ben so reduced by attrition that they are enabled to escape from the system into areas where their presence would have undesirable effects.

Where a cyclone burner is used, an additional advantage is obtained because of the added heat available from combustion of what would otherwise be waste material.

It will be understood that in the present invention, the separation systems located in the carbonizer can be made as efficient as desired to substantially completely remove all solid particles from the gaseous overhead streams, thus avoiding fouling of distillation equipment and stills.

In the drawings, the separation devices have been shown as cyclone separators, and a two-stage cyclone has been used to indicate the more efficient separation system. It will be understood that this is purely for the sake of illustration, and that any desired separation system may be employed, so long as there is one less effective system and that this is associated with a stage in the process where the offtake gas contains no recoverable quantities of carbonization products, but rather contains only inert gases or oxidation products which have no particular value, other than as a source of sensible heat. It is possible, for example, that the less efficient separation device be a two-stage cyclone and the more efficient separation device a single-stage cyclone.

What I claim is:

1. In a process for the carbonization of finely divided solid carbonaceous material in which at least a portion of said material is oxidized in a first fluidized powder bed and carbonaceous material is carbonized in a second fluidized powder bed, there being cyclic interchange of solids between said beds, and wherein a first gaseous product stream carrying entrained solids is removed from said first bed and a second gaseous product stream carrying entrained solids is removed from said second bed, the improvement which comprises removing at least a major fraction of the entrained solids from said second gaseous stream and returning said removed solids to said second bed, removing a major fraction, but a fraction substantially less than said first-named fraction, of the entrained solids from said first stream, returning said solids removed from said first stream to said first bed, while retaining in said first stream solids of substantially greater particle size than the smallest particles removed from said second stream, and removing the solids retained in said first stream from the process.

2. A process as claimed in claim 1, in which the solid particles retained in said first stream are burned in a vortically moving body of gas to form a liquid slag and hot gaseous products of combustion.

3. A process as claimed in claim 2, in which the hot gaseous products of combustion are used to furnish heat in said first bed.

4. In a process for the low temperature carbonization of coal comprising preoxidizing fluidized finely divided coal, carbonizing said preoxidized coal in a first fluidized bed to produce char and a stream of gaseous hydrocarbons containing entrained solids, conveying char from said first bed to a second fluidized bed, burning a portion of the char in said second fluidized bed to heat the unburned char and produce a stream of gaseous products of combustion containing entrained solids and conveying said heated unburned char from said second bed to said first bed, the improvement which comprises removing at least a major fraction of the entrained solids from said gaseous hydrocarbon stream and returning them to said first bed, removing a major fraction, but a fraction substantially less than said first-named fraction, of entrained solids from said gaseous products of combustion stream and returning them to said second bed, while retaining entrained in said gaseous products of combustion stream solids having a substantially greater particle size than the smallest particles removed from said gaseous hydrocarbons, and removing the particles retained in said gaseous products of combustion from the process.

5. A process as claimed in claim 4, wherein the gaseous products of combustion and retained solids are charged to a vortically moving body of gas and said solids are burned in said body of gas to give a liquid slag and a hot gas.

6. A process as claimed in claim 5, wherein the hot gas is used in preoxidizing said coal.

7. In a process for the low temperature carbonization of coal comprising feeding finely divided coal to a first fluidized solids bed in admixture with hot char, preoxidizing said coal in said first bed with the production of a first gaseous product stream containing entrained solids, charging preoxidized coal and char to a second fluidized solids bed and carbonizing said preoxidized coal in said second bed to form char and a gaseous hydrocarbon stream containing entrained solids, the improvement which comprises removing a major fraction of the entrained solids from said gaseous hydrocarbon stream and returning said solids to said second bed, removing a major fraction, but a fraction substantially less than said first-named fraction, of solids from said first gaseous product stream and returning said solids to said first bed, while retaining entrained in said first stream solids having a substantially greater particle size than the smallest particles removed from said hydrocarbon stream, and removing the particles retained in said first stream from the process.

8. A process as claimed in claim 7, in which the first gaseous product stream containing entrained solids is charged to a vortically moving body of gases and said solid particles are burned therein to give a liquid slag and hot gas.

9. A process as claimed in claim 8, wherein said hot gas is used in the first bed for preoxidation.

10. Apparatus for the carbonization of finely divided solid carbonaceous material which comprises a carbonization vessel, means for maintaining a first fluidized bed of finely divided solid particles in said carbonization vessel, an oxidation vessel, means for maintaining a second fluidized bed of finely divided solid particles in said oxidation vessel, means for conveying solids from said first bed to said second bed and from said second bed to said first bed, a first offtake means for removing gaseous product from said first fluidized bed, said first offtake means including a first solids separation system and means for returning separated solids from said first solids separation system to said first bed, a second offtake means for removing gaseous product from said second fluidized bed, said second offtake means including a second solids separation system and means for returning separated solids from said second solids separation system to said second bed, said second solids separation system being of lower effectiveness than said first solids separation system to permit the escape from the apparatus of solid particles of a size which would be returned to said first bed by said first solids separation system.

11. Apparatus as claimed in claim 10, and including a cyclone burner and means connecting the second solids separation system with said burner, whereby solid particles passing through said second solids separation system can be burned to produce a liquid slag and hot gases.

12. Apparatus as claimed in claim 11, and including means connecting the cyclone burner to the oxidation vessel whereby the hot gases produced in said burner can be used in said oxidation vessel.

13. Apparatus as claimed in claim 10, in which the solids separation systems are cyclone systems.

14. Apparatus as claimed in claim 13, in which the first solids separation system is a multiple stage cyclone system, and the second solids separation system is a cyclone system having fewer stages than said first system.

15. Apparatus for the low temperature carbonization of coal which comprises a carbonization vessel, means for maintaining a first fluidized bed of finely divided coal and char in said carbonization vessel, a heat generator, means for maintaining a second fluidized bed of finely divided char in said heat generator, means for conveying solids from said first bed to said second bed and from said second bed to said first bed, a first offtake means for removing gaseous hydrocarbons from said carbonization vessel, said first offtake means including a first solids separation system and means for returning separated solids from said first solids separation system to said first bed, a second offtake means for removing gaseous products of combustion from said heat generator, said second offtake means including a second solids separation system and means for returning separated solids from said second solids separation system to said second bed, said second solids separation system being of lower effectiveness than said first solids separation system to permit the escape from said heat generator of solid particles which would be returned to said carbonization vessel by said first solids separation system.

16. Apparatus as claimed in claim 15, and including a cyclone burner and means connecting said second solids separation system with said cyclone burner, whereby solid particles coming from said heat generator through said second solids separation system may be burned to produce a liquid slag and hot gases.

17. Apparatus as claimed in claim 16, and including a preoxidation vessel, means for charging coal to said preoxidation vessel, and means for delivering preoxidized coal from said preoxidation vessel to said carbonization vessel, in combination with means connecting said cyclone burner with said preoxidation vessel whereby the hot gases produced in said cyclone burner may be delivered to said preoxidation vessel.

18. Apparatus for the low temperature carbonization of coal which comprises a carbonization vessel, means for maintaining a first fluidized bed of finely divided coal and char in said carbonization vessel, a preoxidation vessel, means for maintaining a second fluidized bed of finely divided coal and char in said preoxidation vessel, means for delivering solids from said first bed to said second bed and from said second bed to said first bed, a first offtake means for removing a hydrocarbon product from said carbonization vessel, said first offtake means including a first solids separation system and means for returning separated solids from said first solids separation system to said first bed, a second offtake means for removing gaseous product from said preoxidation vessel, said second offtake means including a second solids separation system and means for returning separated solids from said second solids separation system to said second bed, said second solids separation system being of lower effectiveness than said first solids separation system to permit the escape from said preoxidation vessel of solid particles which would be returned to said first bed by said first solids separation system.

19. Apparatus as claimed in claim 18, and including a cyclone burner and means connecting said second solids separation system with said cyclone burner whereby solids escaping from said second solids separation system may be burned in said cyclone burner to produce a liquid slag and hot gas.

20. Apparatus as claimed in claim 19, and including means connecting said cyclone burner with said preoxidation vessel whereby hot gases removed from said cyclone burner may be delivered to said preoxidation vessel.

No references cited.